United States Patent [19]

Courtois

[11] Patent Number: 5,038,347
[45] Date of Patent: Aug. 6, 1991

[54] METHOD AND SYSTEM FOR TRANSMITTING BUFFERED DATA PACKETS ON A COMMUNICATIONS NETWORK

[75] Inventor: Pierre-Jacques F. C. Courtois, Rhode St. Genese, Belgium

[73] Assignee: U.S. Philips Corp., New York, N.Y.

[21] Appl. No.: 462,685

[22] Filed: Jan. 9, 1990

[30] Foreign Application Priority Data

Jan. 17, 1989 [FR] France .............................. 89 200090

[51] Int. Cl.$^5$ .............................................. H04J 3/24
[52] U.S. Cl. ................................... 370/94.1; 370/85.1; 370/85.6; 370/85.9; 340/825.5
[58] Field of Search ................ 370/16, 67, 85.1, 85.2, 370/85.4, 85.6, 85.7, 85.9, 85.12, 85.15, 94.1; 340/825.5, 825.51, 825.05

[56] References Cited

U.S. PATENT DOCUMENTS

| | | | |
|---|---|---|---|
| 4,161,786 | 7/1979 | Hopkins et al. ..................... | 370/85.2 |
| 4,313,196 | 1/1982 | Oblonsky ............................ | 370/85.6 |
| 4,510,599 | 4/1985 | Ulug ................................... | 370/85.6 |
| 4,730,307 | 3/1988 | Hughes et al. ..................... | 370/85.1 |

FOREIGN PATENT DOCUMENTS

8603639 6/1986 PCT Int'l Appl. .

OTHER PUBLICATIONS

IEEE Proposed Standard: DQDB Metropolitan Area Network, Aug. 7, 1989, pp. 23-35.

*Primary Examiner*—Douglas W. Olms
*Assistant Examiner*—Alpus H. Hsu
*Attorney, Agent, or Firm*—Jack D. Slobod

[57] ABSTRACT

A method and system for transmitting data packets in time slots on a communications network having first and second unidirectional buses which are oppositely directed and a plurality of access units coupled therebetween. To form a distributed queue of all data packets, which are to be transmitted on the first bus, each access unit establishes a queue of the data packets therein, transmits a request flag on the second bus for each data packet in the queue in such access unit, keeps count of the number of request flags passing such access unit on the second bus, and transmits the data packet at the head of its queue after a predetermined number of empty time slots has passed such access unit on the first bus. To achieve improved flexibility and adjustability in relation to the traffic density of the data packets at different access units, at the time a further data packet which has been added to the queue in an access unit reaches a selected position in such queue, which position is a predetermined number of packets before the head of the queue, a request flag is transmitted on the second bus by such access unit. The further data packet is subsequently transmitted in the first empty time slot on the first bus following passage past such access unit of a predetermined number of empty time slots on such bus, the predetermined number of empty slots being equal to the total number of data packets in the entire distributed queue for which request flags had already been transmitted when the aforesaid further data packet reaches the selected position in the queue.

16 Claims, 3 Drawing Sheets

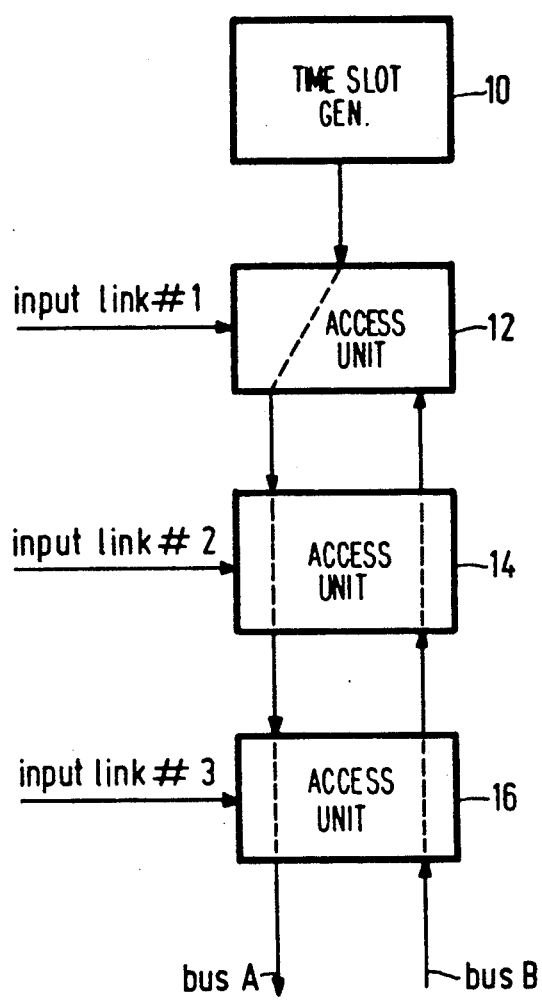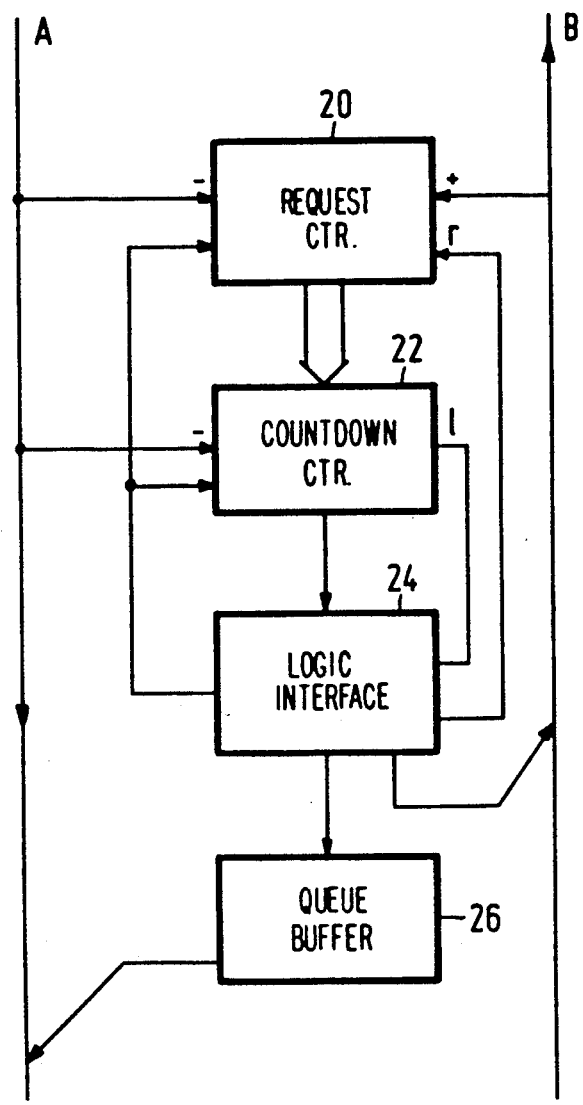
FIG.1
PRIOR ART
FIG.2
PRIOR ART

METHOD AND SYSTEM FOR TRANSMITTING BUFFERED DATA PACKETS ON A COMMUNICATIONS NETWORK

BACKGROUND OF THE INVENTION

1. Field of the Invention

The invention relates to a method and system for transmitting data packets in time slots on a communications network having first and second unidirectional buses which are oppositely directed and a plurality of access units coupled between the buses, said method including the steps of forming a distributed queue of all of the data packets by establishing in each access unit a queue of the data packets therein which are to be transmitted on the first unidirectional bus, transmission by each access unit of a request flag on the second unidirectional bus for each data packet in the queue in such access unit, keeping count in each access unit of the number of request flags passing it on the second unidirectional bus, and transmitting the data packet at the head of the queue in an access unit when a predetermined number of empty time slots has passed such access unit on the first bus.

2. Description of the Related Art

A method of this type is described in the International Patent Publication No. WO 86/03639 published June 18, 1986. According to this prior art method a request flag for a data packet is transmitted on the second bus upon arrival of said data packet at the head of the queue in the access unit. Simultaneously the instantaneous request counter value is loaded in a countdown counter whereafter the request counter is resetted. Thereafter the request counter starts accumulating again the number of request flags passing on the second bus, whereas for each empty time slot detected on the first bus the access unit supplies a decrement signal to the countdown counter. The first empty time slot detected by the access unit after the countdown counter has reached a predetermined end value (e.g. zero) is used by the access unit to transmit the data packet on the first bus. If the queue in the access unit comprises at least one more data packet to be transmitted, the new instantaneous request counter value is loaded into the countdown counter and the whole procedure is repeated until the last data packet in the queue is transmitted. If there are no more data packets in the queue the request counter still accumulates the passing request flags, transmitted by downstream access units, but is simultaneously decremented by each empty time slot passing on the first bus in downstream direction. Therewith the access unit keeps track of all still pending and not answered request flags transmitted by downstream access units.

According to this method each data packet first has to travel through the queue in an access unit. As it reaches the head of the queue the data packet has to wait further for the the passing of a number of empty time slots requested by downstream access units before it can be transmitted. No consideration is given to the length of the queue in an access unit. That implies that the period between the time of arrival of a data packet in an access unit and the time it is actually transmitted will be significantly shorter for an access unit with comparatively low traffic than for an access unit with comparatively busy traffic. It is furthermore found in practice that the waiting period for data packets arriving in an access unit at a relatively short distance from the time slot generator is in average significantly shorter than the waiting time for data packets arriving at an access unit more distant from the time slot generator. This prior art method does not have any provision for assigning predetermined priority to each of the access units. In practice, however, a priority assignment is considered as very helpful in many cases, for instance to avoid relative by long waiting times in access units with high traffic density.

SUMMARY OF THE INVENTION

The object of the invention is to embody a method of the type mentioned in the first paragraph such that the method is significantly more flexible and adjustable taking into account the traffic density and required priority in the various access units.

In agreement with said object the method of transmitting data packets in time slots on a communications network of the type mentioned in the first paragraph is now characterized in that at the time a further data packet, which was received in an access unit and was added to the queue therein, reaches a position at the queue in which there are a predetermined number of data packets between said further data packet and the head of the queue, a request flag is transmitted on the second bus by said access unit. The further data packet is transmitted in the first empty time slot on the first bus after a certain number of free slots on the first bus have passed said access unit, such number of free slots being equal to the total number of data packets in the distributed queue for which request flags had already been transmitted at the time the further data packet reaches the above mentioned position.

By transmitting a request flag for a further data packet at the time said further data packet reaches a position in the queue in which there are a predetermined number of data packets between said further data packet and the head of the queue, which predetermined number is selectable, a very flexible system is provided. A priority scheme can be established by selecting a relatively low number for such position in access units with relatively low priority and selecting a relatively high number for such position in access units with relatively high priority. Selecting a higher number results in faster transmission of data packets in access units with relatively busy traffic.

The invention not only relates to a novel method of transmitting data packets, but also to a system for carrying out such a method. In such a system data are transmitted in time slots on a communication network having first and second unidirectional buses which are oppositely directed and, a plurality of access units being coupled between the buses. Each access unit includes a request flag counter connected to become incremented by each request flag passing on the second bus, a countdown counter connected to become decremented from an initially loaded value to a predetermined end value (such as zero) by successive empty time slots passing on the first bus, a queue buffer for queueing the data packets received in the access unit for transmission on the first bus, and a logic interface. The logic interface transmits a request flag for each data packet in the queue buffer initiates transmission of the data packet at the head of the queue after the countdown counter reaches said predetermined end value, and reloads the countdown counter on the basis of the value accumulated in the request flag counter. The system is characterized in that in the queue buffer, in combination with each data packet a priority value is stored therewith and shifted with it through the stages of said buffer. The logic interface transmits a request flag on the second bus at the time a data packet in the queue buffer reaches a stage thereof a predetermined number of stages before the head of the queue buffer, and stores with such data packet a priority value given by the then accumulated value in the request counter. The logic interface resets the request counter thereafter, and reloads the countdown counter with the priority value of a data packet in the queue buffer as soon as such data packet reaches the head of the queue in the access unit.

This invention is to some extent related to that described in applicant's copending application Ser. No. 07/433,637, filed Nov. 8, 1989.

BRIEF DESCRIPTION OF THE DRAWINGS

The invention will now be described in more detail with reference to the attached drawings, wherein:

FIG. 1 illustrates schematically a communications network in which the invention can be applied.

FIG. 2 illustrates schematically one of the access units in the network according to FIG. 1, functioning in accordance with the above-mentioned prior art method.

DETAILED DESCRIPTION OF THE PREFERRED EMBODIMENTS

Figure 3:
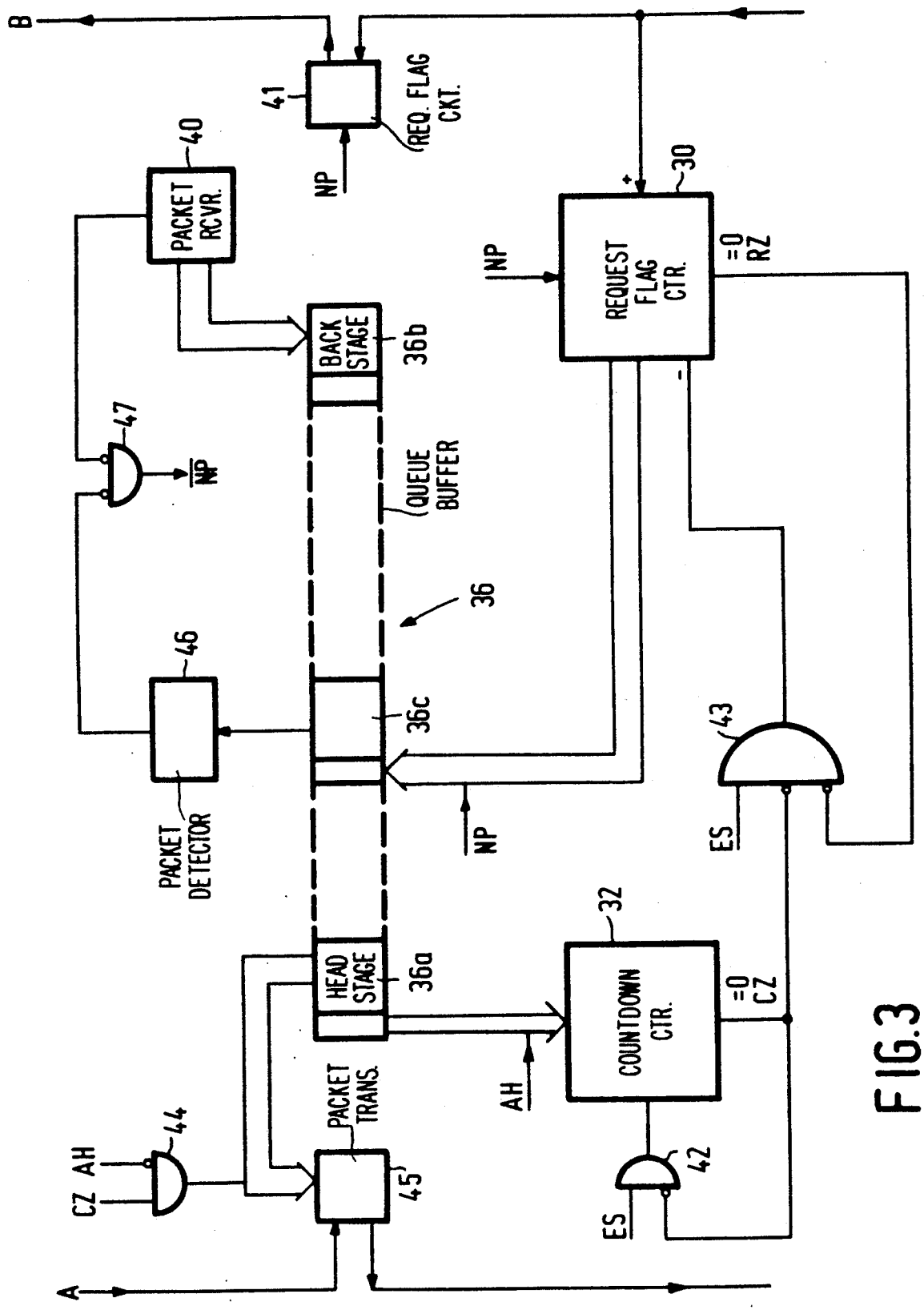
FIG. 3 illustrates a detailed embodiment of an access unit functioning in accordance with the invention.

FIG. 1 illustrates a communications network, comprising a number of input links indicated by 1, 2 and 3 each connected to an access unit 12, 14, 16 respectively. The access units are connected to two unidirectional buses A and B which are oppositely directed. One end of the bus A is connected to a time slot generator 10 defining a continuous succession of time slots on the bus A. Data packets with a predetermined format, adapted to the time slot dimensioning used in the system, can be supplied to one of the input links 1, 2 and 3 and can be further transported on bus A in one of those time slots in a way which will be explained further with reference to the following Figures. The bus B will be used for sending request signals from downstream access units back to upstream access units to indicate to those last-mentioned units that a downstream access unit is waiting for a free time slot to insert a data packet therein.

With reference to FIG. 2 first of all a short explanation will be provided about the functioning of the prior art method as is in detail described in the International Patent Application No. WO 86/03639. In FIG. 2 only some of the hardware components within one of the access units are illustrated, just those components necessary to explain the functioning of this access unit in more detail.

As shown in FIG. 2 the access unit comprises a request counter 20, a countdown counter 22 and an access unit logic interface 24 connected in the illustrated way between the two buses A and B. The bus A is used to transport data packets in predetermined time slots in a downwards direction whereas bus B is used to transport request signals in an upwards direction. Data packets are supplied by not illustrated means to the access unit logic interface 24.

The received data packets are queued up by the logic interface 24 in the queue buffer 26 in the order in which they are received in the access unit. Thereafter the access unit will try to transmit these data packets in the queue one after the other in the following manner. Each time a data packet reaches the head of the queue the logic interface 24 will send a request upwards on bus B to all other access units positioned upstream. In each of those upstream access units this request is received and used to increment the request counter 20. Under control of the time slot generator 10 a continuous succession of time slots is transmitted on bus A and each time an empty slot is passing an access unit the request counter 20 therein is decremented. By decrementing the counter it is recognized that the passing empty slot will serve one of the downstream access units which is waiting to transmit a data packet. It will be clear that the current value in the request counter 20 indicates the number of requests originating from downstream access units which are waiting for an empty time slot passing on the bus A. After letting pass a corresponding number of empty time slots on the bus A it is the turn of the access unit under consideration to transmit the data packet at the heading of his queue. For that purpose the current value in the request counter 20 is loaded into the countdown counter 22 under control of a signal from the access unit logic interface 24 simultaneous with the transmission of the request signal. Thereafter the request counter is reset to zero and starts accumulating request flags again. The countdown counter will be decremented for each empty slot passing on the bus A and the request counter 20 will be incremented for each request passing upwards on bus B. During the period the countdown counter is in action the request counter is incremented. When the countdown counter reaches zero, the access unit logic interface 24 may access the downstream bus A and grab the next empty slot to transmit the data packet from the head position of the queue buffer 26. If thereafter the access unit has another data packet to send the above procedure is repeated using the than existing value in the request counter 20.

As already explained above, this prior art method of handling the input data packets supplied through a number of input links to a transmission bus has the principle disadvantage that the transmission delay shows a significant variation per individual input link depending on the relative queue lengths at the different access units, i.e. depending on the relative time needed at the different access units to reach the head of the queues. It is not possible with this prior art method to develop some sort of priority scheme which, however, would provide a solution for the practical problems encountered in many applications in which the prior art method is implemented.

A method and system according to the invention will now be explained with reference to the embodiments illustrated in FIGS. 3 and 4.

The access unit in FIG. 3 comprises a request counter 30, a countdown counter 32, a queue buffer 36, a circuit 40 for receiving further data packets and supplying these packets to the buffer circuit 36, a packet detector 46, a request flag processing circuit 41, a circuit 45 for transmitting a data packet into an empty time slot, and furthermore a number of gates 42, 43, 44, 47.

The queue buffer 36 in this embodiment comprises a number of stages each having an capacity sufficient not only to store temporarily a data packet to be transmitted, but also to store in combination with each data packet an added value as will be explained further on.

The buffer circuit 36 comprises a number of stages, some of which are referenced in FIG. 3 by reference number 36a (the head stage of the buffer), 36b (the back stage of the buffer) and 36c (some intermediate stage of the buffer). The maximum length of the buffer depends on the expected traffic density in the access unit. Each buffer stage comprises two sections, a first section destined to temporarily store a data packet and a second section destined to temporarily store an added priority value of the data packet. These two sections are for the stages 36a, 36b, 36c schematically indicated in FIG. 3.

In the same way as in FIG. 2 the request counter 30 is incremented by each request flag, transmitted by downstream access units on the bus B upwards and is decremented by each empty time slot passing on bus A from the time slot generator (not shown in FIG. 3) downwards. The increment signals are, as illustrated schematically in FIG. 3 received from the bus B and are supplied to the increment input (+) of the request counter 30. The decrement signals are supplied by the gate 43 to the decrement input (−) of the request counter 30 under control of a signal ES which is related to the empty time slots on bus A.

The various signals illustrated in FIG. 4 can be specified as follows:
AH: packet at head of the queue buffer
ES: empty time slot
NP: further packet is received in predetermined queue buffer stage or is loaded directly in a stage more close to the heading stage of the queue buffer.
CZ: countdown=0
RZ: request counter =0

At the arrival of a data packet to be transmitted by the access unit the circuit 40 takes care that this data packet will be stored temporarily in the queue buffer 36 directly after the preceding data packet in this buffer 36. Furthermore the new packet causes circuit 40 to supply a signal to a gate 47 for purposes as will be explained hereinafter.

The data packets in the queue buffer 36 will gradually move from the right to the left in FIG. 3 towards the head of the queue buffer. As a data packet arrives in a predetermined intermediate stage 36c then this fact will be detected by a packet detector circuit 46. This circuit supplies a signal to the gate 47 in which this signal is combined with the signal from the new packet circuit 40. The result of this combination is that the gate 47 supplies an output signal either in case a packet is received in stage 36c from the directly adjoining stage or a new packet is stored in the buffer 36 in a stage in front of the predetermined stage 36c (which is possible if the instanteous traffic density is very low). The signal at the output of gate 47 is used for a number of purposes. First of all the instantaneous value in the request counter 30 is stored into the second section of stage 36c in combination with the packet just received in the first section of stage 36c. Thereafter the request counter is resetted. Furthermore the output gate 47 will be used to control the request flag circuit 41 to transmit a request flag upwards on bus B.

At the arrival of a data packet at the head of the queue buffer 36 a signal AH will be generated, which signal causes the request counter value, which was added to the data packet at the time this packet arrived at the predetermined intermediate stage 36c, to be loaded in the countdown counter 32. From that moment on the countdown counter 32 will be decremented by each empty time slot passing on bus A, under the influence of the signal ES. This signal ES is generated every time an empty time slot is passing on bus A. The signal ES is supplied to the countdown counter 32 through the gate 42. The gate 42 is used to stop the decrementing process as soon as the countdown counter reaches the zero value. As soon as the countdown counter 32 reaches the zero value the countdown counter 32 generates a signal CZ which is not only supplied to the gate 42 to stop the decrementing process but also supplied two further gates 43 and 44. In gate 44 the signal CZ is combined with the already mentioned signal AH (generated at the time the respective packet reached the head of the queue buffer) leading to an output signal from the gate 44 by means of which the packet is inserted in the next empty time slot by means of the circuit 45. In gate 43 the signal CZ is combined with the signal RZ from the request counter 30 and the empty time slot signal ES with the effect that as long as CZ and RZ are present, the empty time slot signals ES are used to decrement the request counter 30. However, as long as the queue buffer containes further data packets to be transmitted, the countdown counter 32 will be reloaded directly with the value added to the next data packet to be transmitted, causing the disappearance of signal CZ, which in turn will disable gate 43 so that no decrement signals will be supplied to the request counter 30.

If the queue buffer 36 does not contain any more packets to be transmitted then the passing empty time slots on bus A are used again for generating decrement signals to the request counter 30.

Figure 4:
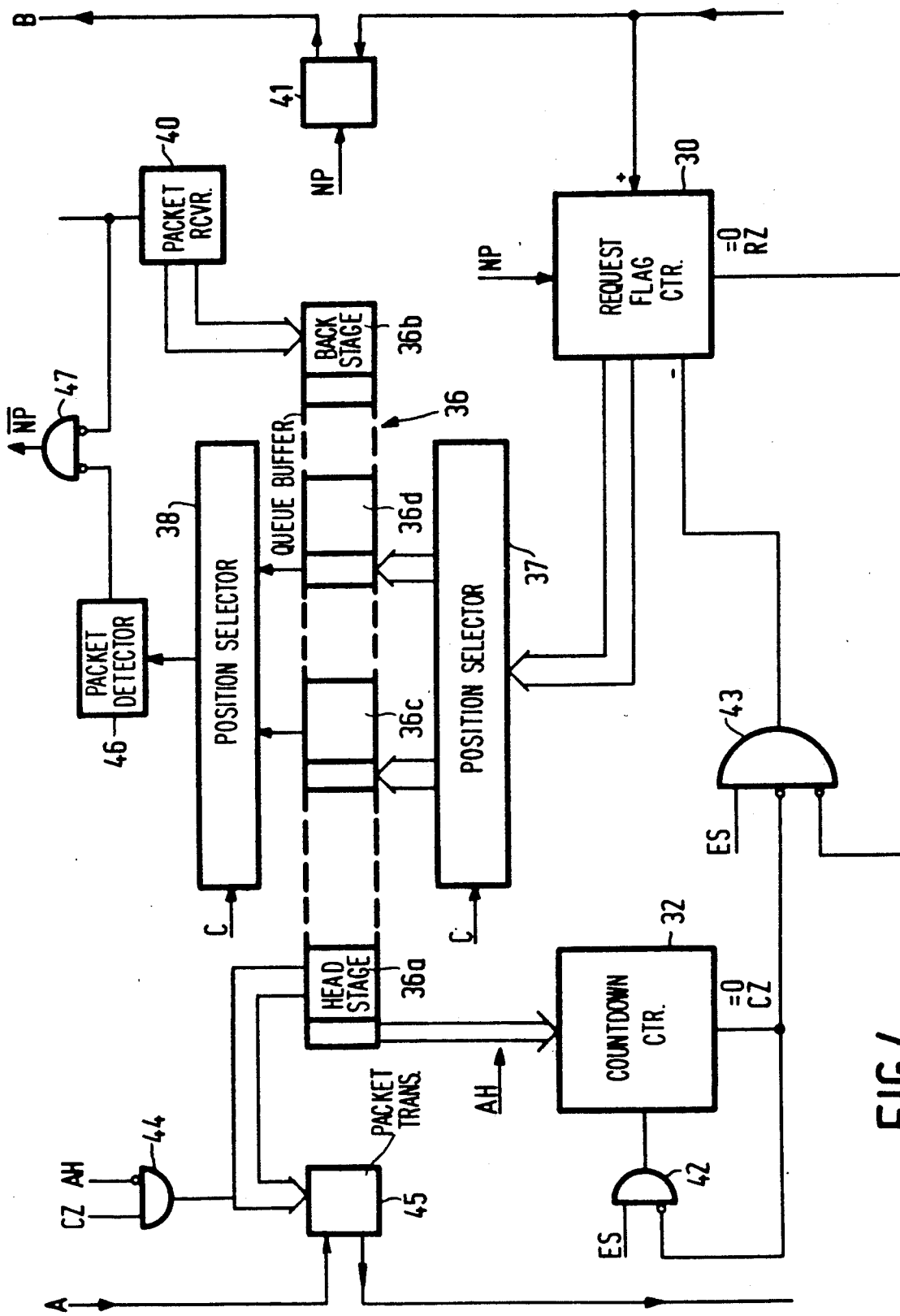
FIG. 4 illustrates a detailed further developed embodiment of an access unit functioning in accordance with the invention.

FIG. 4 illustrates a further developed embodiment of the access unit according to the invention. The differences between FIGS. 3 and 4 reside in the addition of position selectors 37 and 38 in FIG. 4. These position selectors are controllable by means of an external control signal C such that both position selectors are pointing at one specific queue buffer stage selected from a large number of buffer stages and located a predetermined number of stages before the head stage 6a. Such a stage is selected by applying an appropriate control signal C to both position selectors 37 and 38, causing the instantaneous request counter value to be transferred to the selected stage, for instance 36d. This queue buffer stage 36d will be monitored by the packet detector 46 to detect the arrival of a further data packet in such stage. Apart from these differences the further embodiment and the whole functioning of the access unit illustrated in FIG. 4 is identical to those of FIG. 3.

Access units may have to transmit request bits on the upstream bus B at the same time. However, writing and reading on this bus must be unidirectional. A first method of implementation is to use a time bit slotted structure for the upstream bus B.

Another type of access mechanism for the request bit bus B is to use packets combining a number of request bits on the bus B. With for instance 16 access units four bit-strings can be sent synchronously upstream from the most downstream access unit in which the four bit-strings are generated. Each string would be read by every upstream access unit. If no request bit is waiting in the access unit than the bit-string is left unaltered. If a request bit is pending, the string value is incremented by one before being forwarded to the next access unit. Fairness is achieved in this method at the cost of some bandwidth loss (except under heavy loads), but the maximum frequency of increments at the bit request counters is four times smaller than with the above-mentioned time bit slotted structure for the upstream bus B.

I claim:

1. A method of transmitting data packets in time slots on a communications network having first and second unidirectional buses which are respectively directed in downstream and upstream directions and a succession of access units coupled between the buses, said method including the steps of:

forming a distributed queue of such data packets by establishing in each access unit a queue of the data packets therein which are to be transmitted on the first unidirectional bus;

transmitting a request flag on the second unidirectional bus by each access unit for each data packet in the queue;

keeping count in each access unit of the number of request flags passing such access unit on the second unidirectional bus; and transmitting a data packet at the head of the queue in an access unit when a predetermined number of empty time slots has passed said access unit on the first bus;

characterized in that:

at the time a further data packet which had been received in an access unit and added to the queue therein reaches a selected position in the queue, at which position there are a predetermined number of other data packets between said further data packet and the head of the queue, a request flag is transmitted on the second bus by said access unit; and said further data packet is transmitted by said access unit in the first empty time slot after passage of a predetermined number of empty time slots past said access unit on the first bus, said predetermined number of empty time slots being equal to the total number of data packets in the distributed queue for which request flags had already been transmitted at the time said further data packet reaches said selected position in said queue.

2. A method of transmitting data packets in time slots on a communications network according to claim 1, wherein the total number of data packets in the distributed queue for which request flags had already been transmitted at the time said further data packet reaches said selected position in said queue is determined by adding to the further data packet, at the time it arrives at said selected position, a priority value equal to the number of request flags counted by said access unit since arrival of the last data packet preceding said further data packet at said selected position in said queue, the sum of the priority values added to the data packets in the queue within any given access unit being equal to the total number of data packets for which request flags have been transmitted by other access units which are downstream of said given access unit.

3. A method of transmitting data packets in time slots on a communications network according to claim 1, wherein after the arrival of a data packet at said selected position in said queue, such data packet is transmitted on the first bus by the respective access unit in the first empty time slot following passage of a number of empty time slots past such access unit equal to the sum of the priority values of all data packets prior to said data packet.

4. A method of transmitting data packets in time slots on a communications network according to claim 1, wherein the total number of data packets in the distributed queue for which request flags had already been transmitted by other access units at the time said further data packet reaches said selected position in the queue in its access unit is arbitrarily selectable independent of said selected positions in such other access units.

5. A method of transmitting data packets in time slots on a communications network according to claim 1, wherein in each access unit said selected position is chosen in relation to a traffic density of the data packets to be transmitted by such access unit.

6. A method of transmitting data packets in time slots on a communications network according to claim 1, wherein the request flags are transmitted in the form of request bits and the rate at which said request bits are transmitted on the second bus is at least as high as the maximum transmission rate of time slots on the first bus.

7. A method of transmitting data packets in time slots on a communications network according to claim 1, wherein the request flags are transmitted on the second bus by means of request bit-strings, the value of which representing a number of request flags, which bit-strings are successively received by each upstream access unit along the second bus and either retransmitted unaltered if the receiving access unit has no request flag to transmit or retransmitted after incrementation by one if the receiving access unit has a request flag to transmit.

8. A method of transmitting data packets in time slots on a communications network according to claim represented by a request bit-string at the time it is received by an access unit having a data packet ready for transmission is added to such data packet as said priority value thereof.

9. A method of transmitting data packets in time slots on a communications network according to claim 2, wherein after the arrival of a data packet at said selected position in said queue, such data packet is transmitted on the first bus by the respective access unit in the first empty time slot following passage of a number of empty time slots past such access unit equal to the sum of the priority values of all data packets prior to said data packet.

10. A method of transmitting data packets in time slots on a communications network according to claim 9, wherein the total number of data packets in the distributed queue for which request flags had already been transmitted by other access units at the time said further data packet reaches said selected position in the queue in its access unit is arbitrarily selectable independent of said selected positions in such other access units.

11. A method of transmitting data packets in time slots on a communications network according to claim 10, wherein in each access unit said selected position is chosen in relation to a traffic density of the data packets to be transmitted by such access unit.

12. A method of transmitting data packets in time slots on a communications network according to claim 11, wherein the request flags are transmitted in the form of request bits and the rate at which said request bits are transmitted on the second bus is at least as high as the maximum transmission rate of time slots on the first bus.

13. A method of transmitting data packets in time slots on a communications network according to claim 10, wherein the request flags are transmitted on the second bus by means of request bit-strings, the value of which representing a number of request flags, which bit-strings are successively received by each upstream access unit along the second bus and either retransmitted unaltered if the receiving access unit has no request flag to transmit or retransmitted after incrementation by one if the receiving access unit has a request flag to transmit.

14. A method of transmitting data packets in time slots on a communications network according to claim 13, wherein the value represented by a request bit-string at the time it is received by an access unit having a data packet ready for transmission is added to such data packet as said priority value thereof.

15. A system for transmitting data packets in time slots on a communications network having first and second unidirectional buses which are respectively directed in upstream and downstream directions, and a succession of access units coupled between the busses; each access unit comprising:
- a request flag counter connected to become incremented by request flags passing on the second bus;
- a countdown counter connected to become decremented from an initially loaded value to a predetermined end value by successive empty time slots passing on the first bus;
- a queue buffer for storing data packets received by said access unit and which are to be transmitted on the first bus; and
- a logic interface adapted to (i) transmit a request flag for each data packet in the queue buffer, (ii) initiate transmission of the data packet at the head of the queue after the countdown counter reaches said predetermined end value, and (iii) reload said countdown counter on the basis of a value accumulated in the request flag counter; characterized in that in each access unit:
  the queue buffer is adapted to store in combination with each data packet therein a priority value which is shifted with the data packet through the queue buffer; and
  said logic interface is adapted to (iv) transmit a request flag on the second bus at the time a further data packet in the said buffer reaches a selected stage therein a predetermined number of stages prior to the head of said buffer, (v) store with said further data packet in said buffer a priority value corresponding to the accumulated value in said request counter when said further data packet reaches said selected stage of said buffer, and reset said request counter; and (vi) reload said countdown counter with the priority value of said further data packet in said buffer when said further data packet reaches the head of said buffer.

16. A system according to claim 15, further comprising means for selecting, under the control of a control signal, any of the stages of said buffer prior to the head stage thereof to be said selected stage of said buffer.

* * * * *